United States Patent
Choi et al.

[11] Patent Number: 5,856,411
[45] Date of Patent: Jan. 5, 1999

[54] RESINS FOR USE IN CHEMICALLY AMPLIFIED RESISTS AND MANUFACTURING METHODS THEREOF

[75] Inventors: Sang-jun Choi; Chun-geun Park, both of Kyungki-do, Rep. of Korea

[73] Assignee: Samsung Electronics Co., Ltd., Kyungki-do, Rep. of Korea

[21] Appl. No.: 665,231

[22] Filed: Jun. 17, 1996

[30] Foreign Application Priority Data

Jan. 12, 1996 [KR] Rep. of Korea ............... 1996 532

[51] Int. Cl.$^6$ ............... C08C 19/22; C08F 12/24
[52] U.S. Cl. ............... 525/376; 526/313
[58] Field of Search ............... 526/313; 525/376

[56] References Cited

U.S. PATENT DOCUMENTS

| | | |
|---|---|---|
| 4,480,034 | 10/1984 | Hsieh . |
| 4,534,059 | 8/1985 | Yamada . |
| 4,678,843 | 7/1987 | Elmore et al. . |
| 4,689,371 | 8/1987 | Elmore et al. . |
| 4,822,862 | 4/1989 | Rupp et al. . |
| 4,857,601 | 8/1989 | Gupta . |
| 4,869,994 | 9/1989 | Gupta et al. ............... 526/313 |
| 4,877,843 | 10/1989 | Gupta . |
| 5,004,762 | 4/1991 | Gupta ............... 526/213 |

*Primary Examiner*—Joseph L. Schofer
*Assistant Examiner*—N. Sarofim
*Attorney, Agent, or Firm*—Myers Bigel Sibley & Sajovec, LLP

[57] ABSTRACT

Resins for use in chemically amplified resists are represented by the general formula (I):

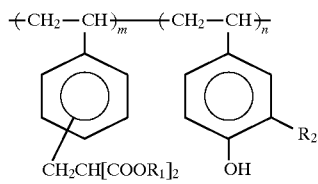

wherein $R_1$ is t-butyl or tetrahydropyranyl; $R_2$ is hydrogen or methyl; n and m are integers; and the ratio $n/((m+n))$ ranges from 0.1 to 0.9. Methods for manufacturing the resins comprise reacting a monomer represented by the formula (II):

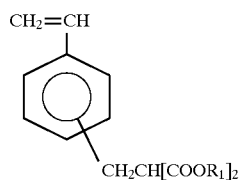

with a monomer represented by the formula (III):

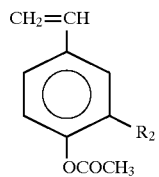

to form a copolymer represented by the formula (IV):

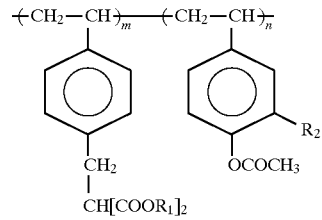

wherein $R_1$ and $R_2$ are defined as above; and hydrolyzing acetoxy groups contained in the copolymer represented by the formula (IV) to form the resin compositions.

7 Claims, 6 Drawing Sheets

RESINS FOR USE IN CHEMICALLY AMPLIFIED RESISTS AND MANUFACTURING METHODS THEREOF

FIELD OF THE INVENTION

The present invention relates to resins for use in chemically amplified resists and a methods for manufacturing the same. More particularly, the invention relates to resins which are highly sensitive to light so as to be sufficiently soluble in developing solution, and methods of manufacturing the same.

BACKGROUND OF THE INVENTION

The increased integration of semiconductor devices requires the formation of fine patterns having line widths of typically a quarter micron. Accordingly, lithography processes which employ deep ultraviolet ray (deep-UV) technology (248 nm) offer significant increases in resolution because of the shorter, and thus more energetic wavelengths used in comparison to conventional g-line (436 nm) and i-line (365 nm) rays.

A resist material for use in conjunction with deep-UV technology is referred to as a chemically amplified resist. In general, a chemically amplified resist typically comprises a resin containing a dissolution inhibiting group along with a photo acid generator (PAG). Upon exposure to light, an acid is generated by the PAG and acts as a catalyst to heighten the solubility of the resist when contacted by a developing solution. More specifically, the dissolution inhibiting group of the resin reacts with the acid so as to allow the resin to dissolve readily in developing solution. At the same time, the transparency of the resist during the light exposure is maintained.

One of the main factors in determining the performance of a chemically amplified resist is an index relating to the change in solubility of the resist before and after exposure to light. The difference in the solubility is determined by several factors. One of the factors relates to the decomposition rate of the dissolution inhibiting group contained on the resin in the presence of an acid catalyst which is activated by light. Another factor relates to solubility of the exposed resin in a developing solution.

In light of the above, resins have been sought which exhibit high decomposition rates upon exposure to light and high solubility levels in developing solutions. Additionally, resins not exposed to light should dissolve as slowly as possible in developing solutions. Such resins are typically manufactured by polymerizing a monomer containing a t-BOC (t-butoxycarbonyl) group. The presence of a t-BOC group is advantageous in that it is converted to a hydroxy group by acidolysis upon light exposure. The resist which contains the hydroxy group dissolves readily in developing solution. At the same time, the unexposed resin containing the unconverted t-BOC group does not easily dissolve in developing solution.

In spite of the desirable properties of the above resins, the resins can pose processing difficulties. Specifically, the resins often possess poor thermal stability. Since high temperatures are typically employed in resin processing, the resins often burn and decompose. Accordingly, there is a need in the art to provide resins which exhibit the desirable properties described herein while displaying adequate thermal stability.

SUMMARY OF THE INVENTION

In view of the above, it is an object of the present invention to provide resins use in chemically amplified resists which exhibit a large difference in solubility in developing solution between exposed and unexposed states.

This and other objects, features, and advantages of the present invention are provided by resins for use in chemically amplified resists. Specifically, the resins are represented by the general formula (I):

wherein $R_1$ is selected from the group consisting of t-butyl and tetrahydropyranyl; $R_2$ is selected from the group consisting of hydrogen and methyl; n and m are integers; and the ratio of $n/(m+n)$ ranges from 0.1 to 0.9. In one preferred embodiment, the base resin has a weight average molecular weight ranging from 5,000 to 200,000. In another preferred embodiment, $R_1$ is t-butyl and $R_2$ is hydrogen.

The invention also relates to methods of manufacturing the resins. In general; the methods comprise reacting a monomer represented by the formula (II):

with a monomer represented by the formula (III):

to form a copolymer represented by the formula (IV).

Subsequently, the acetoxy groups contained in the copolymer are hydrolyzed to form the resin. Preferably, the mole ratio of the monomer represented by the formula (II) to the monomer represented by the formula (III) ranges from 0.1:0.9 to 0.9:0.1.

The monomer of formula (II) is preferably formed by the process of reacting chloromethyl styrene represented by the formula (V):

with a malonate derivative represented by the formula (VI):

thus forming the monomer of formula (II).

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The present invention relates to resins for use in a chemically amplified resists. The resins are represented by the formula (I):

wherein $R_1$ is selected from the group consisting of t-butyl and tetrahydropyranyl; $R_2$ is selected from the group consisting of hydrogen and methyl; n and m are integers; and the ratio of n/(m+n) ranges from 0.1 to 0.9. In one preferred embodiment, $R_1$ is t-butyl and $R_2$ is hydrogen. In another preferred embodiment, the weight average molecular weight of the base resin ranges from 5,000 to 200,000.

In addition, the present invention relates to methods of manufacturing the resins represented by the formula (I). Specifically, the methods include reacting a monomer represented by the formula (II):

wherein $R_1$ is selected from the group t-butyl and tetrahydropyranyl, with a monomer represented by the formula (III):

wherein $R_2$ is selected from the group consisting of hydrogen and methyl, to form a copolymer represented by the formula (IV):

The acetoxy groups of the copolymer are then hydrolyzed to form the resin represented by the formula (I).

The monomers represented by the formulas (II) and (III) can be produced in accordance with any suitable process known in the art. In particular, the monomer of the formula (II) may be produced by reacting chloromethyl styrene represented by the formula (V):

with a malonate derivative represented by the formula (VI):

wherein $R_1$ is defined herein.

The reaction proceeds as follows:

During the above reaction, the malonate derivative typically is present in an organic solvent containing a base. Preferably, tetrahydrofuran (THF) is employed as the organic solvent and sodium hydride is employed as the base. After a few hours, chloromethyl styrene is added to the above malonate derivative forming a reaction mixture. The reaction mixture is heated to an elevated temperature and the chloromethyl styrene and malonate derivative react to form the monomer of the formula (II) contained in the reaction mixture. Subsequently, the monomer of formula (II) is separated from the reaction mixture.

The monomer of formula (II) is then reacted with a monomer represented by the formula (III) to form the copolymer represented by the formula (IV). The polymerization reaction proceeds as follows:

Referring to the above polymerization reaction, monomers of the formulae (II) and (III) are typically dissolved in an organic solvent, preferably toluene, thus forming a mixture. The mole ratio of the monomer represented by the formula (II) to the monomer represented by the formula (III) preferably ranges from 0.1:0.9 to 0.9:0.1. The polymerization is typically carried out in the presence of a polymerization initiator. Any known and suitable polymerization initiator may be employed, including free radical initiators, such as, for example, azobiisobutyronitrile and benzoyl peroxide. The polymerization is usually carried out for about 24 hours at a temperature ranging from 65° C. to 75° C. so as to form a copolymer represented by the formula (IV).

The above copolymer is subsequently hydrolyzed, in which the acetoxy groups of the copolymer are converted to hydroxy groups to form the resin of the invention represented by formula (I). The hydrolyzing reaction may be accomplished by any conventional method. Advantageously, the malonate groups of the copolymer are not affected during the hydrolyzing reaction. Preferably, the hydrolysis is carried out by first dissolving the copolymer of formula (VII) in a solvent, preferably dioxane. Hydrazine is then added to the solvent and copolymer and the resulting mixture is left at room temperature to allow for the conversion of the acetoxy groups to hydroxy groups thus forming the resin of the present invention.

The resins of the present invention are highly advantageous. In the preferred embodiment for example, the presence of the two t-butyl groups serve to inhibit dissolution of the resins prior to exposure to light. Upon exposure, acidolysis of the resins converts the two t-butyl groups into two carboxyl groups per one site. The reaction is represented as follows:

In contrast to unexposed resin, the presence of the carboxyl groups in the resins allows for the ready dissolution in developing solution. Accordingly, the use of chemically amplified resists containing the resins of the present invention facilitates the formation of fine patterns in a lithography process.

The following examples are provided to illustrate the present invention, and should not be construed as limiting thereof.

EXAMPLE 1

Figure 1:
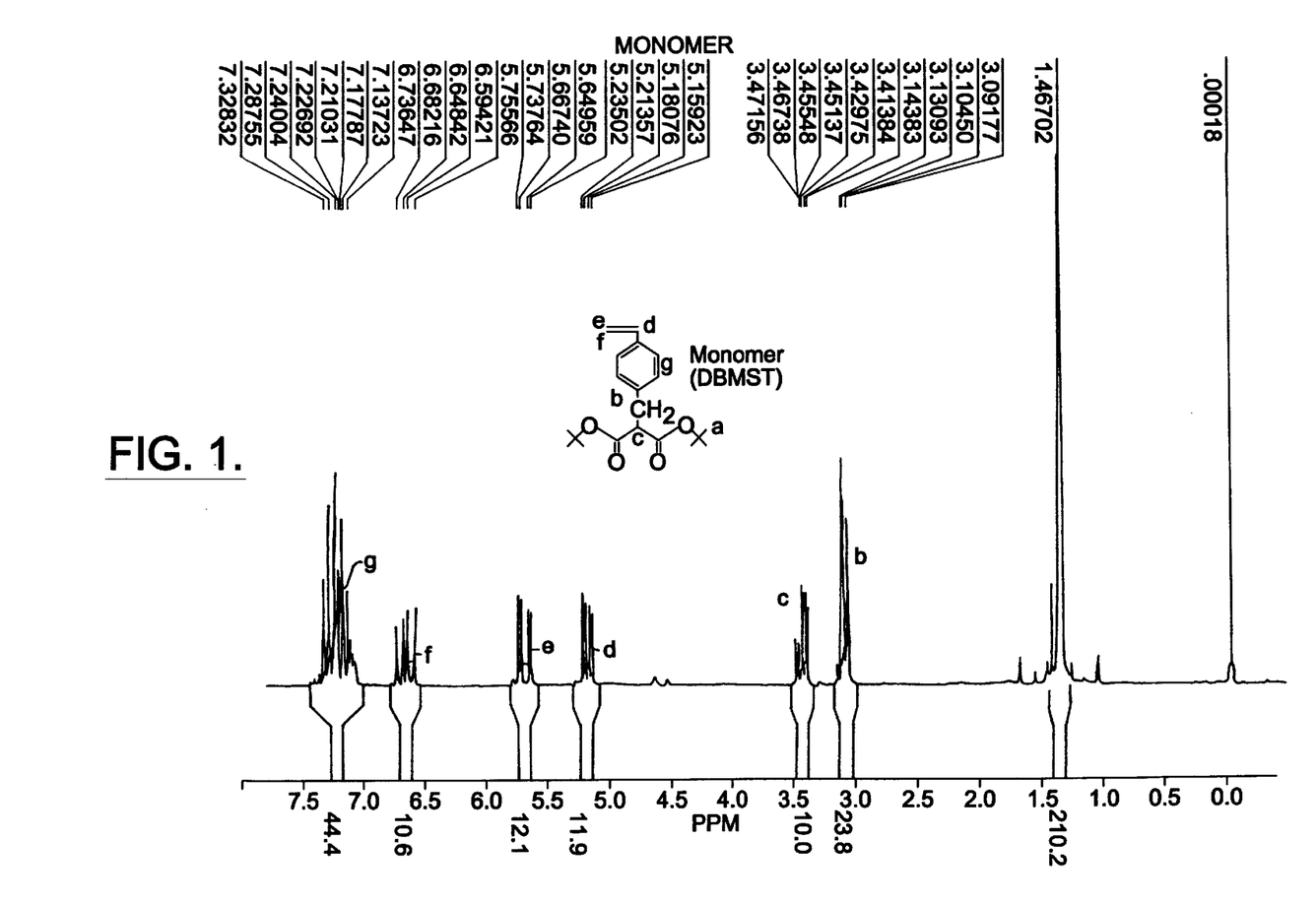
FIG. 1 is an $^1$NMR spectrum of a monomer manufactured according to an embodiment of the present invention.

4.8 gm (0.12 mol) of NaH was dissolved in 250 ml of tetrahydrofuran in a flask. Subsequently, 25 gm of di-(t-butyl)malonate (0.11 mol) was slowly added to the mixture. After two hours, 15 gm of chloromethyl styrene (0.1 mol) was slowly added to the mixture, and the mixture was allowed to react at 65° C. for 12 hours. The reaction mixture was dried to remove any tetrahydrofuran present. Subsequently, the resulting product was added to excess water, and then neutralized with HCl. The product was then extracted with diethylether (50 ml×4). The residual water contained in the extract was removed with magnesium sulfate as a drying agent. The product was purified by using a thin-film evaporator so as to obtain a yield of 75%. The $^1$NMR and IR spectra of the obtained compound are presented in FIGS. 1 and 2 respectively. These spectra indicate that the compound may be represented by the following formula:

$^1$H-NMR(CDCl$_3$)(ppm): 1.4(s, 18H), 3.1(d, 2H), 3.5(t, 1H), 5.2(dd, 1H), 5.7(dd, 1H), 6.6(dd, 1H), 7.2(m, 4H).

Figure 2:
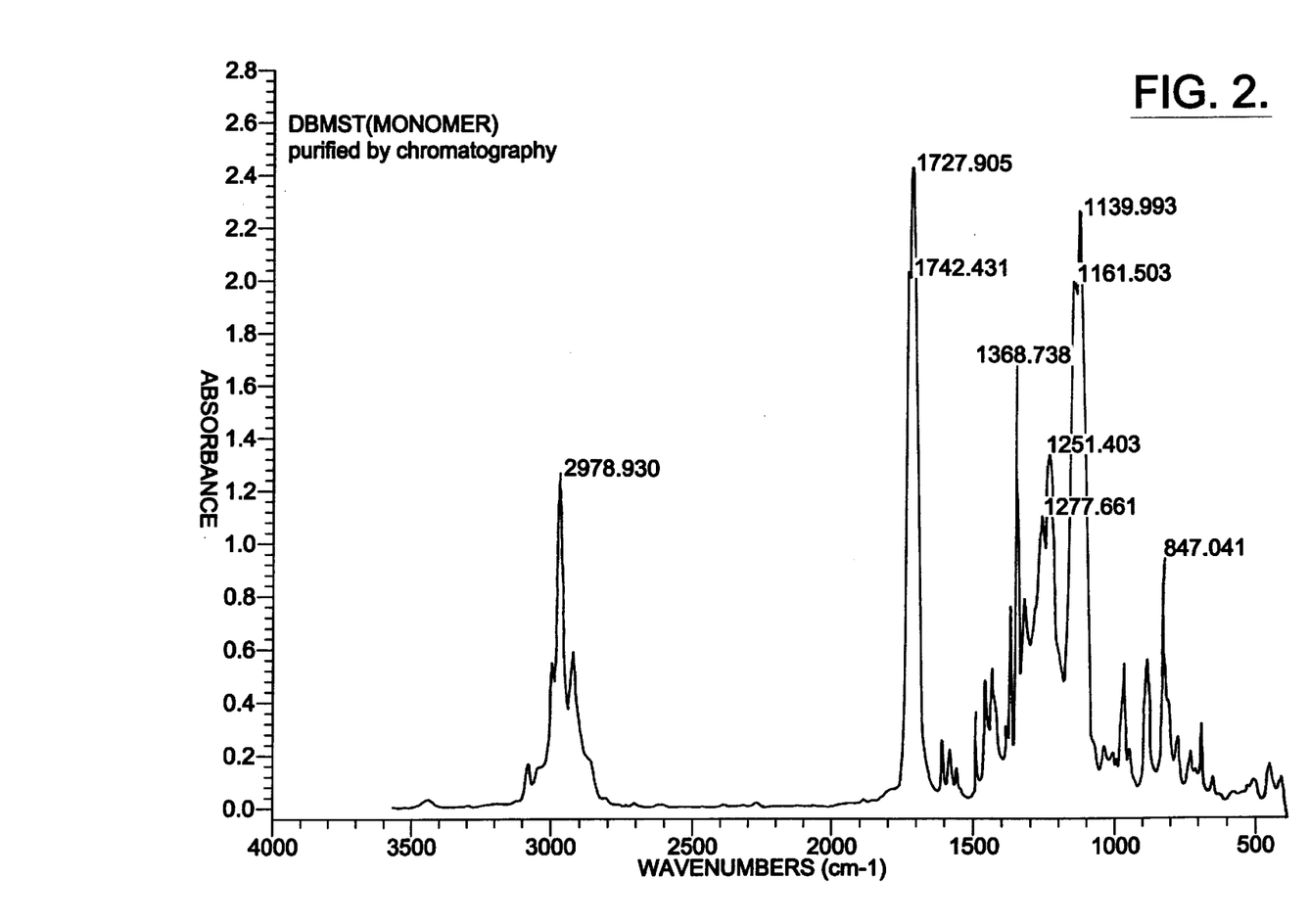
FIG. 2 is an IR spectrum of the monomer shown in FIG. 1.

IR(cm$^{-1}$): 2978(C—H, t-butyl), 1727(C=O), 1369, 1140, 847.

EXAMPLE 2

Figure 3:
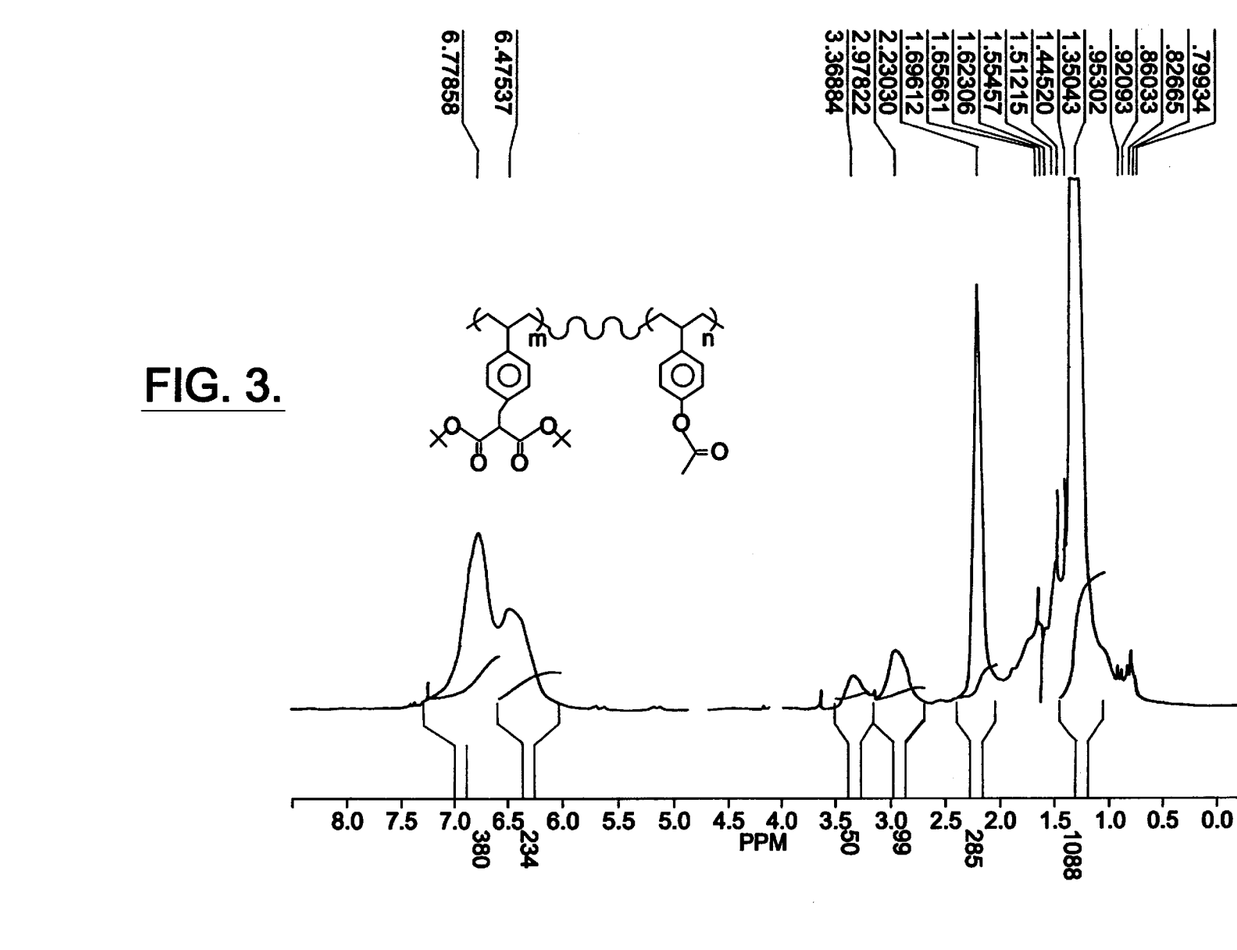
FIG. 3 is an $^1$NMR spectrum of a copolymer manufactured using the monomer shown in FIG. 1.
Figure 4:
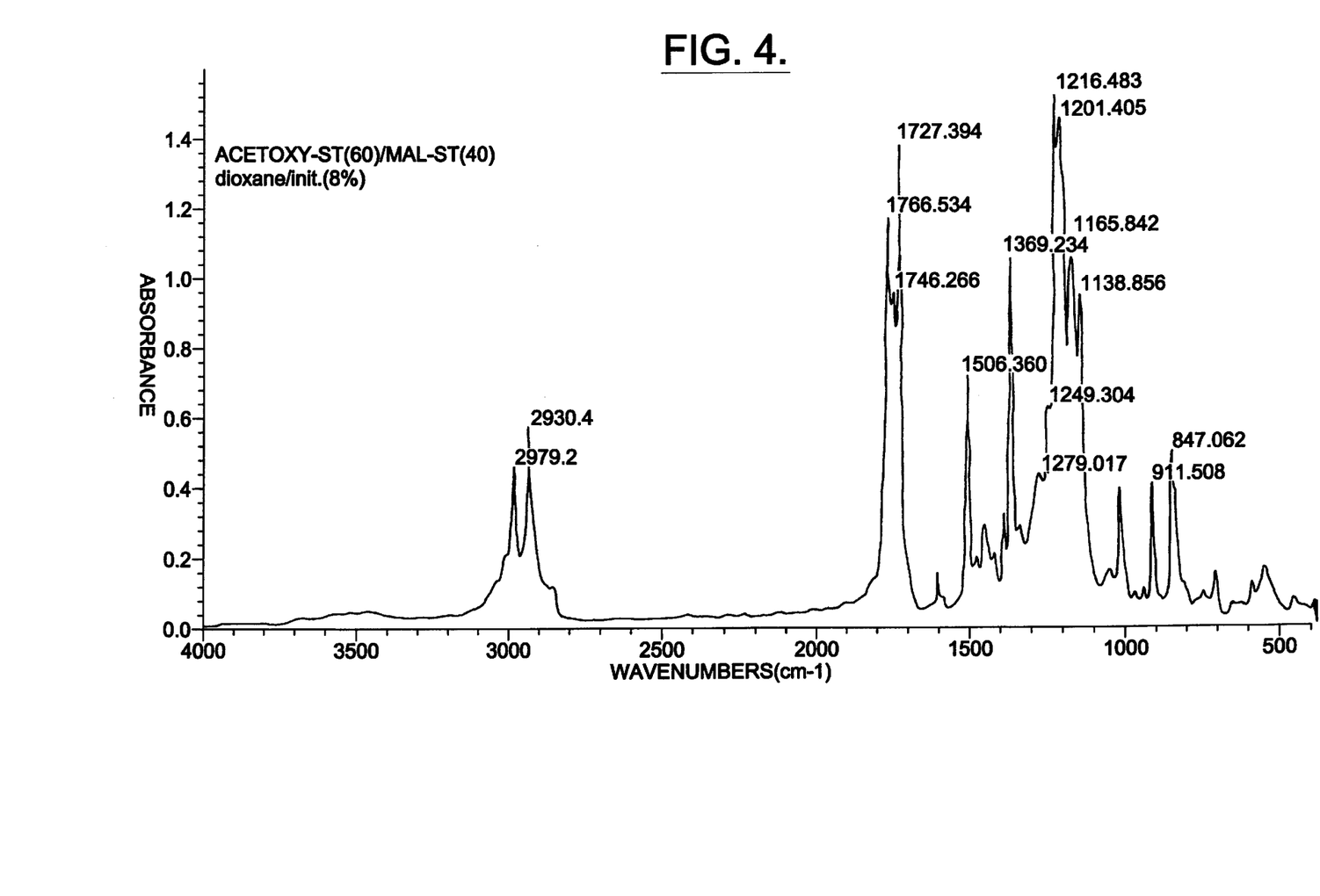
FIG. 4 is an IR spectrum of the copolymer shown in FIG. 3.

3 gm (9 mmol) of the compound prepared in Example 1 and 3 gm (18 mmol) of acetoxy styrene were dissolved in 25 ml of toluene. 0.22 gm of azobisisobutyronitrile (AIBN) was added to the above solution, and the resulting mixture was allowed to react for 24 hours at 70° C. Upon completion of the reaction, petroleum ether was poured into the reaction mixture to precipitate the product. The precipitated product was washed with methanol and filtered. The precipitate was dried in a vacuum oven at 50° C. for 24 hours to obtain a compound. The $^1$NMR and IR spectra of the obtained compound are presented in FIGS. 3 and 4 respectively. The above spectra indicate that the compound is a copolymer represented by the following formula represented below: The obtained yield was 85%.

EXAMPLE 3

Figure 5:
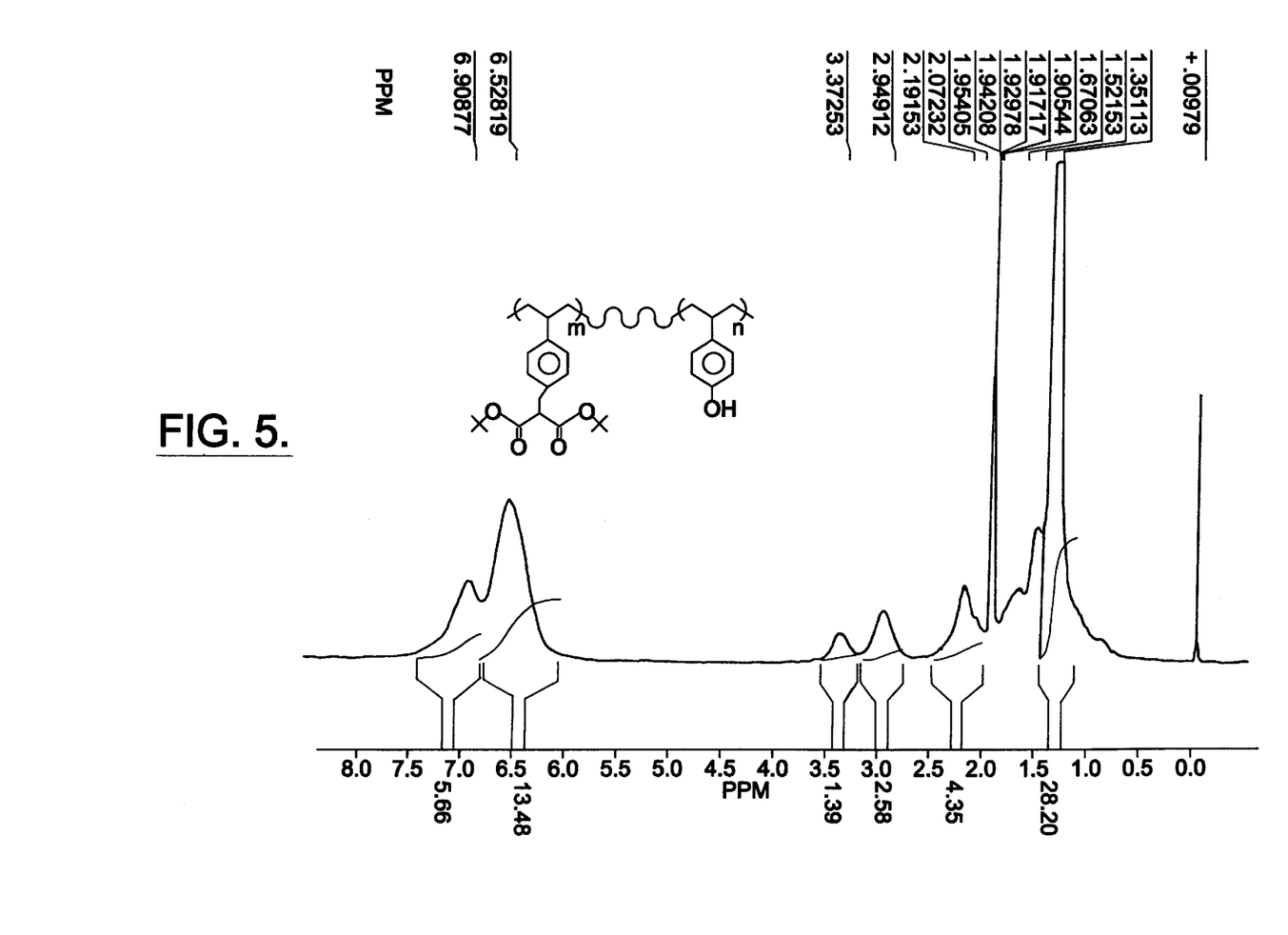
FIG. 5 is an $^1$NMR spectrum of a copolymer manufactured by hydrolyzing the copolymer shown in FIG. 3.
Figure 6:
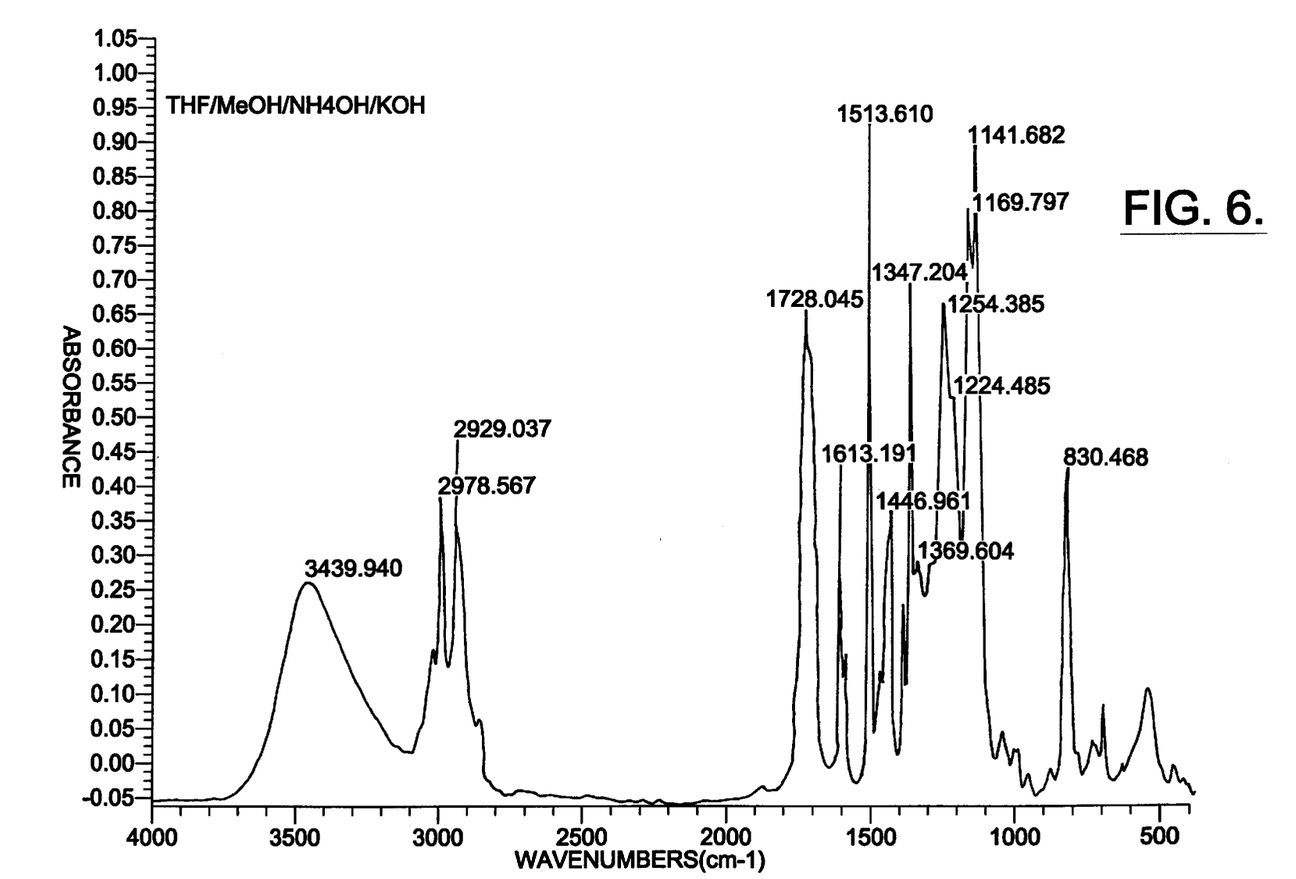
FIG. 6 is an IR spectrum of the copolymer shown in FIG. 5.

5 gm of the copolymer prepared in Example 2 was dissolved in 60 ml of dioxane. 5 ml of 80% hydrazine solution was added to the above solution. The resulting mixture was allowed to react at room temperature for 5 hours. Subsequently, the above mixture was slowly added to excess water, and then neutralized with HCl. A polymer precipitate was filtered by a glass filter. The precipitate was then dissolved in tetrahydrofuran, and reprecipitated in n-hexane. The reprecipitated polymer was filtered, and then dried in a vacuum oven at 50° C. for 24 hours to obtain a polymer. The $^1$NMR and IR spectra of the obtained polymer are presented in FIGS. 5 and 6 respectively. The spectra thereof indicate that the polymer may be represented by the formula:

The yield was 95%.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of manufacturing a resin, being represented by the general formula (I):

wherein $R_1$ is selected from the group consisting of t-butyl and tetrahydropyranyl; $R_2$ is selected from the group consisting of hydrogen and methyl; n and m are integers; and the ratio of n/(m+n) ranges from 0.1 to 0.9, said method comprising:

reacting a monomer represented by the formula (II):

with a monomer represented by the formula (III):

to form a copolymer represented by the formula (IV):

wherein the mole ratio of the monomer of formula (II) to the monomer of formula (III) ranges from 0.1:0.9 to 0.9:0.1;

dissolving the copolymer of formula (IV) in a solvent; and adding hydrazine to the dissolved copolymer to form the resin represented by the formula (I).

2. A method of manufacturing a resin according to claim 1, wherein said step of reacting the monomer represented by the formula (II) with a monomer represented by the formula (III) is carried out in the presence of a polymerization initiator.

3. A method of manufacturing a resin according to claim 2, wherein the polymerization initiator is selected from the group consisting of azobiisobutyronitrile and benzoyl peroxide.

4. A method of manufacturing a resin according to claim 1, wherein the solvent is dioxane.

5. A method of manufacturing a resin according to claim 1, wherein said step of reacting the monomer represented by the formula (II) with a monomer represented by the formula (III) occurs at a temperature ranging from 65° C. to 75° C.

6. A method of manufacturing a resin according to claim 1, wherein said step of reacting the monomer represented by the formula (II) with a monomer represented by the formula (III) takes place for about 24 hours.

7. A method of manufacturing a resin according to claim 1, wherein $R_1$ is t-butyl and $R_2$ is hydrogen.

* * * * *